No. 661,178. Patented Nov. 6, 1900.
W. G. HILL, Jr.
PROCESS OF VULCANIZATION.
(Application filed Mar. 5, 1900.)
(No Model.)
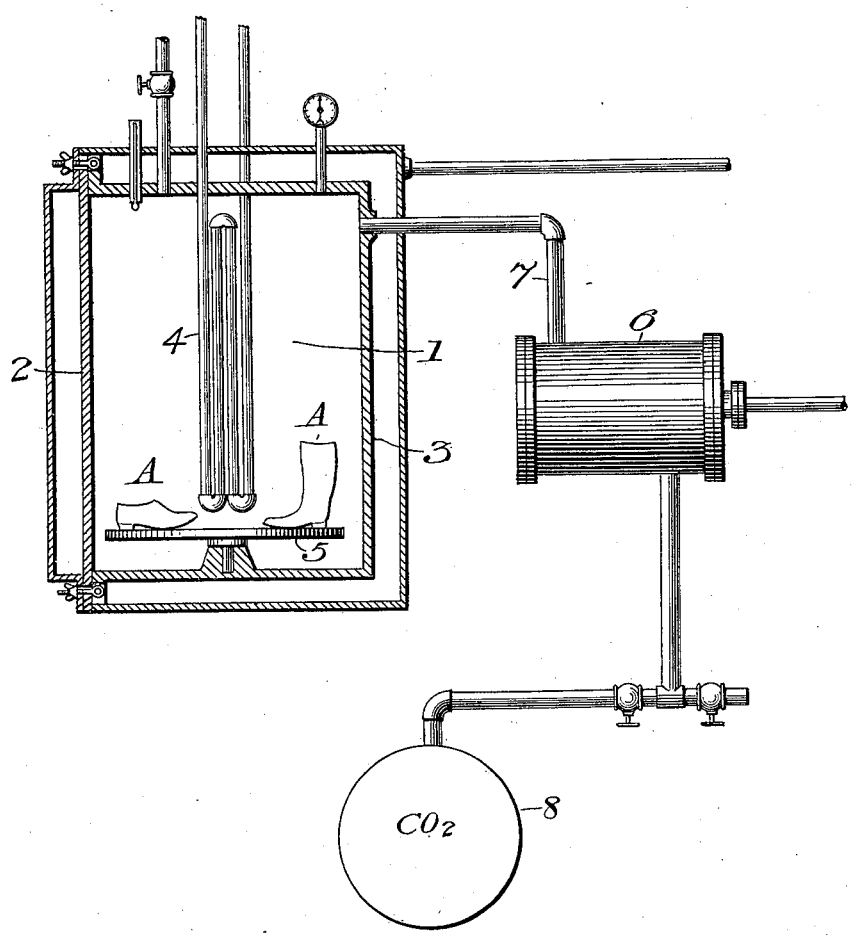
Witnesses:
A. E. Grant.
J. E. Hutchinson Jr.
Inventor:
William G. Hill Jr.
by Pennie & Goldsborough,
Attys.

United States Patent Office.

WILLIAM G. HILL, JR., OF MALDEN, MASSACHUSETTS.

PROCESS OF VULCANIZATION.

SPECIFICATION forming part of Letters Patent No. 661,178, dated November 6, 1900.

Original application filed January 9, 1900, Serial No. 826. Divided and this application filed March 5, 1900. Serial No. 7,385.

(No specimens.)

*To all whom it may concern:*

Be it known that I, WILLIAM G. HILL, Jr., a citizen of the United States, residing at Malden, in the county of Middlesex, State of Massachusetts, have invented certain new and useful Improvements in Processes of Vulcanization; and I do hereby declare the following to be a full, clear, and exact description of the invention, such as will enable others skilled in the art to which it appertains to make and use the same.

In a companion application for Letters Patent of the United States, filed January 9, 1900, Serial No. 826, I have described certain new and useful improvements in the vulcanization of india-rubber, gutta-percha, and allied gums and have claimed the same with particular reference to the employment, broadly, of a heated dry aeriform fluid (and specifically dry air) maintained under suitable conditions of superatmospheric pressure, which I have found greatly to expedite the operation and result in the production of goods of notably higher grade.

The present application, which constitutes a division of the application referred to, relates, broadly, to the employment of an inert gas (preferably carbon dioxid) in the general process of vulcanization, and more specifically to the employment therein of such a gas under superatmospheric pressure, as will hereinafter more fully appear.

As explained in my said companion application, the vulcanization of rubber goods I have found to be greatly improved by employing as the vulcanizing atmosphere a gas that is inert with respect to the goods under treatment. Carbon dioxid I have found particularly available for employment as the inert vulcanizing agent, not only because of its cheapness of production, but also for the reason that in addition to its non-oxidizing character and consequent lack of any tendency to combine with the sulfur present to form sulfuric acid it seems to exert a peculiarly beneficial effect upon the tensile strength of the rubber compound undergoing vulcanization, so that the resulting product in some instances from a compound wherein the india-rubber element is of an inferior grade, such as the Central American or African gum, is brought up to a quality closely approximating that of grades of Para rubber, as vulcanized under ordinary processes. Furthermore, Para rubber itself when so treated I find to be correspondingly improved in quality.

In the practice of my invention I may employ the inert gas—such as carbonic dioxid, nitrogen, or the like—in the usual process of vulcanization familiar to the trade and known as the "dry" process, by merely substituting for the dry air employed therein a like surrounding atmosphere of the inert gas. I prefer, however, to maintain the atmosphere of inert gas, in which the objects to be vulcanized are placed under pressure.

In the accompanying drawing I have illustrated an apparatus adapted for the practice of the invention, either with or without pressure.

In said drawing, 1 indicates a hot room or retort provided with a door 2, adapted to be made air-tight and heated by means of an outer jacket filled with steam and by a steam-coil introduced within the retort. This steam-coil 4 is preferably located at the center of the hot room or retort, and the articles to be treated—for instance, the rubber shoes A—are placed upon a rotating table 5, by which they are slowly carried about within the hot room, and thereby more evenly subjected to the heat striking them from the said coils and the walls 3. This prevents certain parts of the articles from receiving more heat than the others, and thereby being unevenly vulcanized. In order to create a pressure within the hot room, I may conveniently employ a pump 6 or the like, adapted to force the dry carbonic dioxid or other inert gas into the hot room through a suitable conduit 7.

When operating under pressure, I prefer to proceed as follows: Having placed the articles to be vulcanized upon the receiving table or platform within the hot room and having tightly closed the door, the pump is set in motion and the dry carbonic dioxid or other dry inert gas is forced into the room until the pressure therein rises to from thirty to one hundred pounds per square inch. At the same time the above-described heating means brings the temperature within the hot chamber to from 240° to 300° Fahrenheit. It will of course be understood that I do not absolutely limit myself to these particular pressures and temperatures, although I have found them suitable in practice and recommend them for general use in the practice of the invention. These conditions of heat and pressure being maintained until vulcanization is complete, the time required varying from a few minutes to from one to two hours, according to the character of the article being treated, and the platform or table having been made to uniformly continue its motion, the articles will be found to be perfectly vulcanized, whereupon they may be removed through the entrance-door of the hot room. If desired, the hot carbon dioxid just before the removal of the vulcanized articles may be permitted to escape, in whole or in part, into a storage-tank, so as to be used again in a subsequent vulcanizing operation.

As hereinbefore intimated, I attribute the improved results incident to the employment of carbon dioxid or other inert gas or mixtures of inert gas, as the surrounding atmosphere in the vulcanizing operation, largely to the fact that they are of a non-oxidizing character. They therefore have no tendency to unite with the sulfur to form oxids of sulfur nor with the sulfur and such moisture as may be present upon the rubber or fabric to form sulfuric acid nor with the rubber itself to form resinous products.

Having thus described my invention, what I claim is—

1. The herein-described process of vulcanizing rubber and allied gums, which consists in heating the rubber compound in an atmosphere of an inert gas, substantially as set forth.

2. The herein-described process of vulcanizing rubber and allied gums, which consists in heating the rubber compound in an atmosphere of a non-oxidizing gas, substantially as set forth.

3. The herein-described process of vulcanizing rubber and allied gums, which consists in heating the rubber compound in an atmosphere of carbon dioxid, substantially as set forth.

4. The process of vulcanizing rubber and allied gums which consists in surrounding with inert gas the substance to be vulcanized, heating the gas to a temperature sufficient to vulcanize the substance, and subjecting the gas to pressure irrespective of that which may be due to the expansion of the gas by heat; substantially as described.

5. The process of vulcanizing rubber and allied gums, which consists in surrounding with non-oxidizing gas the substance to be vulcanized, heating the gas to a temperature sufficient to vulcanize the substance, and subjecting the gas to pressure irrespective of that which may be due to the expansion of the gas by heat; substantially as described.

6. The process of vulcanizing rubber and allied gums, which consists in surrounding with carbon-dioxid gas the substance to be vulcanized, heating the gas to a temperature sufficient to vulcanize the substance, and subjecting the gas to pressure irrespective of that which may be due to the expansion of the gas by heat; substantially as described.

In testimony whereof I affix my signature in presence of two witnesses.

WILLIAM G. HILL, JR.

Witnesses:
BENJAMIN L. M. TOWER,
JOHAN M. ANDERSEN.